(12) United States Patent
Xu et al.

(10) Patent No.: US 9,702,976 B2
(45) Date of Patent: Jul. 11, 2017

(54) TIME OF FLIGHT CAMERA

(71) Applicant: Microsoft Technology Licensing, LLC, Redmond, WA (US)

(72) Inventors: Zhanping Xu, Sunnyvale, CA (US); Travis Perry, Menlo Park, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 382 days.

(21) Appl. No.: 14/524,814

(22) Filed: Oct. 27, 2014

(65) Prior Publication Data
US 2016/0116594 A1    Apr. 28, 2016

(51) Int. Cl.
G01C 3/08 (2006.01)
G01S 17/32 (2006.01)
G01S 17/36 (2006.01)
G01S 17/89 (2006.01)
G01S 7/491 (2006.01)

(52) U.S. Cl.
CPC ......... G01S 17/32 (2013.01); G01S 7/4915 (2013.01); G01S 17/36 (2013.01); G01S 17/89 (2013.01)

(58) Field of Classification Search
CPC ......... G01S 17/32; G01S 17/89; G01S 17/36; G01S 7/4915
USPC ....................................................... 356/5.01
See application file for complete search history.

(56) References Cited

U.S. PATENT DOCUMENTS

| | | | | |
|---|---|---|---|---|
| 6,288,776 | B1* | 9/2001 | Cahill | G01B 11/24 356/496 |
| 6,580,496 | B2* | 6/2003 | Bamji | G01S 17/36 356/141.1 |
| 7,719,662 | B2* | 5/2010 | Bamji | G01C 3/08 356/3.1 |
| 8,587,771 | B2 | 11/2013 | Xu et al. | |
| 8,629,976 | B2 | 1/2014 | Hui et al. | |
| 2012/0176476 | A1 | 7/2012 | Schmidt et al. | |
| 2013/0177236 | A1 | 7/2013 | Kim et al. | |
| 2013/0222550 | A1 | 8/2013 | Choi et al. | |
| 2014/0049767 | A1 | 2/2014 | Benedetti et al. | |
| 2014/0232825 | A1 | 8/2014 | Gotschlich | |
| 2016/0047913 | A1* | 2/2016 | Lamesch | G01S 17/36 702/159 |

FOREIGN PATENT DOCUMENTS

DE  102013207653  11/2013
EP  1793243  6/2007

OTHER PUBLICATIONS

Choi Ouk et al., "Interframe consistent multifrequency phase unwrapping for time-of-flight cameras", Optical Engineering, Soc of Photo-Optical Instrumentation Engineers, Bellingham, vol. 52, No. 5, May 1, 2013. pp. 057005-1-057005-12.

(Continued)

Primary Examiner — Mark Hellner
(74) Attorney, Agent, or Firm — A.C. Entis-IP Ltd.

(57) ABSTRACT

A CW-TOF camera that uses a piecewise constant or linear discretized indicator function of first and second modulation frequencies of light that the camera transmits to illuminate a scene and a round trip time $t_R$ for light from and back to the camera for features in the scene to disambiguate wrapped phase shifts that the camera acquires for the features.

20 Claims, 3 Drawing Sheets

(56) References Cited

OTHER PUBLICATIONS

Zang L et al., "Terahertz multiwavelength phase imaging without 2 π Ambiguity", Optics Letters, Optical Society of America, US, vol. 31, No. 24, Dec. 15, 2006, pp. 3668-3670.

"International Search Report & Written Opinion Received For PCT Application No. PCT/US2015/056295", Mailed Date: Jan. 29, 2016, 17 Pages.

Mei, et al., "Phase Unwrapping and Denoising for Time-of-Flight imaging using Generalized Approximate Message Passing", In 20th IEEE International Conference on Image Processing, Sep. 15, 2013, pp. 364-368.

Droeschel, et al., "Multi-Frequency Phase Unwrapping for Time-of-Flight Cameras", In Proceedings of IEEE/RSJ International Conference on Intelligent Robots and Systems, Oct. 2010, 7 pages.

Kraft, et al., "3D-Camera of High 3D-Frame Rate, Depth-Resolution and Background Light", In Proceedings of OPTO, May 2004, 6 pages.

Conroy, et al., "A Power-Saving Modulation Technique for Time-of-Flight Range Imaging Sensors", In Proceedings of SPIE Optical Metrology, Jun. 2011, 13 pages.

"High Optical Power for New 3D Camera", Published on: Jun. 1, 2011, Available at: http://www.semiconductorpackagingnews.com/uploads/1/OSRAM_laser_diode_used_in_new_3D_camera4.pdf.

Butler, et al., "Shake'n'Sense: Reducing Interference for Overlapping Structured Light Depth Cameras", In Proceedings of CHI Conference on Human Factors in Computing Systems, May 5, 2012, 4 pages.

Hansard, et al., "Time-of-Flight Cameras: Principles, Methods and Applications", In Publication of Springer, Nov. 2012, 102 pages.

U.S. Appl. No. 12/459,033, BAMJI, CYRUS "Method and System for Lossless Dealiasing in Time-of-Flight (TOF) Systems", Filed Date: Jun. 26, 2009.

Xu, Zhanping et al., "Enhanced Multiprobing Recovering Algorithm Based on Color Mixed Nonlinear Modulation and its Application in a 3D Vision System", In Proceedings of Intelligent Robots and Computer Vision XIV: Algorithms, Techniques, Active Vision, and Materials Handling, vol. 2588, Oct. 1995, Abstract.

Xu, Zhanping, "Investigation of 3D-imaging Systems Based on Modulated Light and Optical RF-interferometry (ORFI)", In Publication of Shaker Verlag GmbH, 1999, 211 pages (previosly published by University of Siegen 1998).

\* cited by examiner

TIME OF FLIGHT CAMERA

BACKGROUND

A "continuous wave" time of flight (TOF) camera (CW-TOF), transmits an amplitude modulated "continuous wave" of electromagnetic radiation, optionally IR light, having intensity that is typically periodically modulated to illuminate a scene that the camera images. Light reflected from the transmitted light by a feature in the scene reaches the camera as a wave of reflected light having a same modulation as the transmitted light but shifted in phase by a phase shift, "φ". The camera images the reflected light on a pixel or pixels of a photosensor and controls exposure periods of the photosensor so that a pixel imaging the feature accumulates an amount of charge responsive to a cross-correlation of the exposure periods and the reflected light that is a function of phase shift φ.

SUMMARY

An aspect of an embodiment of the disclosure relates to providing a CW-TOF camera that illuminates a scene with first and second light waves having their intensities modulated at first and second modulation frequencies $f_1$ and $f_2$ respectively to acquire a wrapped phase shift for a feature in the scene for each of the modulation frequencies. The CW-TOF camera unwraps at least one of the wrapped phase shifts to determine a wrapping number n for the at least one wrapped phase shift and therefrom a distance to the feature responsive to a piecewise constant or linear, "indicator" function. The indicator function is a function of a round trip time $t_R$ of light from the CW-TOF camera to the feature and back to the camera and is optionally discontinuous at boundaries of domains of adjacent pieces of the function. The function assumes values in substantially non-overlapping ranges of values for roundtrip times in domains of adjacent pieces of the indicator function, and may be referred to as a "discretized indicator function" (DIN, or DIN function). A value of the DIN function along a constant or linear piece of the DIN function is referred to generically as a discretized indicator value, or DIN value. For wrapped phase shifts for a same modulation frequency, different wrapping numbers associated with round trip times in domains of adjacent pieces of the DIN function are indicated by different DIN values.

To determine a wrapping number for the at least one wrapped phase shift, the CW-TOF camera processes the first and second wrapped phase shifts to provide a value, which may be referred to as a "trial indicator", which in the absence of error in the wrapped phase shifts is, optionally, equal to a DIN value of the DIN function. The CW-TOF camera determines a most probable DIN value for the feature responsive to the trial indicator, and therefrom a wrapping number of the at least one wrapped phase shift and the distance to the feature.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the discussion below features of a CW-TOF camera, in accordance with an embodiment of the disclosure are discussed with reference to FIG. 1A. The figure schematically shows the CW-TOF camera imaging a scene with light that the camera transmits to illuminate the scene, and graphically illustrates features of phase shifts of light reflected from the transmitted light that reaches the camera from different features in the scene.

The phase shift of light reflected by a given feature in the scene from the transmitted light back to the CW-TOF camera is equal to $2\pi$ times the round trip time to and back from the feature divided by the modulation period of the transmitted light. In symbols, $\phi = 4\pi df/c = 2\pi ft_R, = 2\pi t_R/T$ where "d" is a distance of the feature from the camera, "f" is the frequency of modulation, "T" is the period of the modulation, "c" is the speed of light, and $t_R$ is the round trip time. The CW-TOF camera determines a "wrapped" phase shift, $\phi'$, from charge accumulated by a pixel in the camera photosensor that images the given feature responsive to reflected light from the feature that is incident on the pixel. However, the wrapped phase shift for the feature is the real phase shift φ modulo $2\pi$ and as a result is the same to within a multiplicative constant for a distance d of the feature from the camera and for a distance (d+nc/2f) from the camera, where n is any integer equal to or greater than 1. The wrapped phase shifts acquired by the CW-TOF camera are therefore ambiguous with respect to distances from the CW-TOF camera, and a given wrapped phase shift may for example refer to a distance (d+nc/2f) for any n equal to or greater than 0. In accordance with an embodiment of the disclosure, the CW-TOF camera therefore unwraps the wrapped phase for the given feature to determine a wrapping number n for the wrapped phase and from the wrapping number the corresponding real phase φ and a distance d to the feature.

Figure 1A:
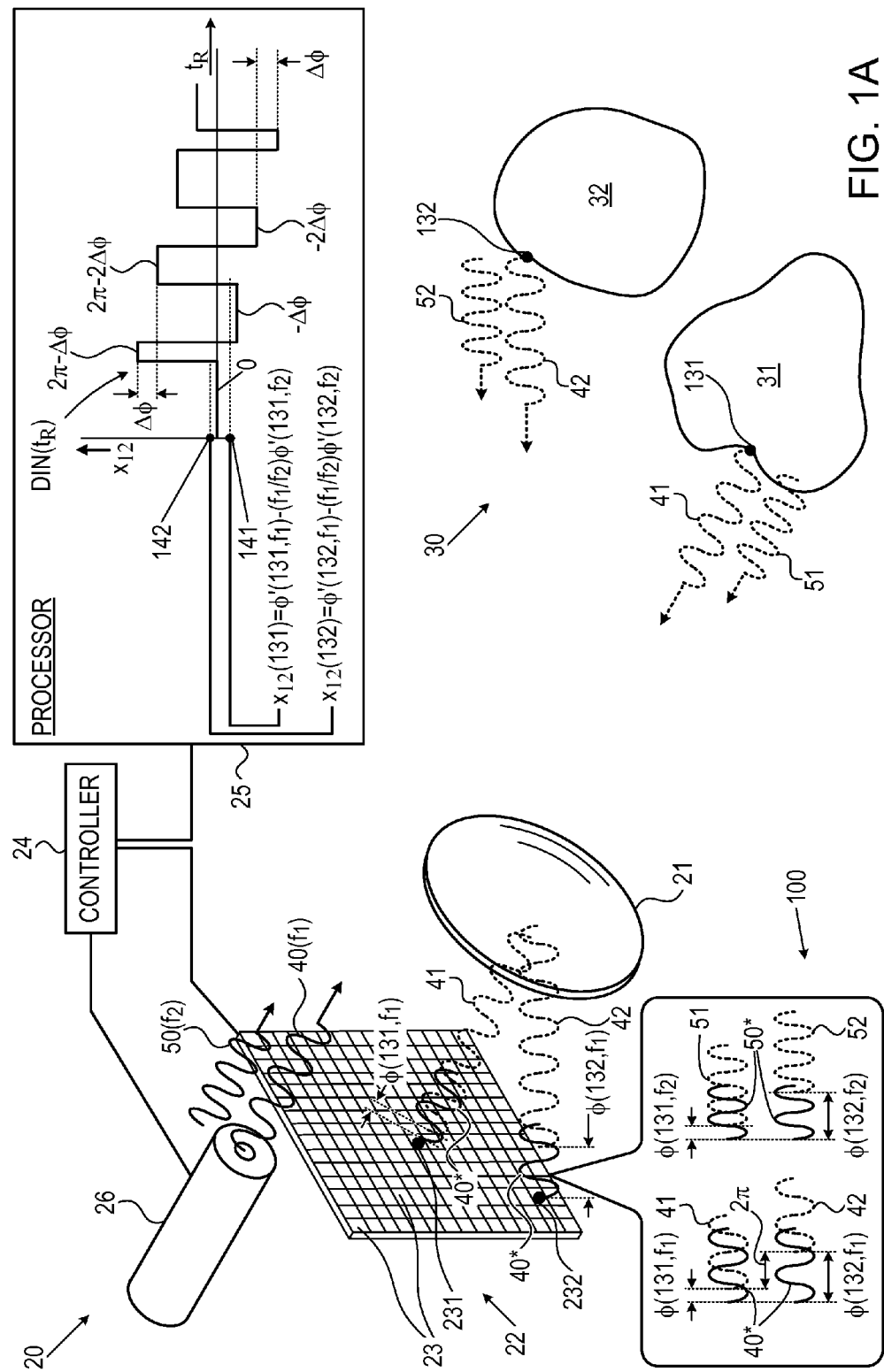
FIG. 1A schematically shows a CW-TOF camera transmitting first and second light waves having intensities continuously modulated at respectively first and second different modulation frequencies to illuminate a scene and determine distances to features in the scene responsive to a DIN, in accordance with an embodiment of the disclosure.
Figure 1B:
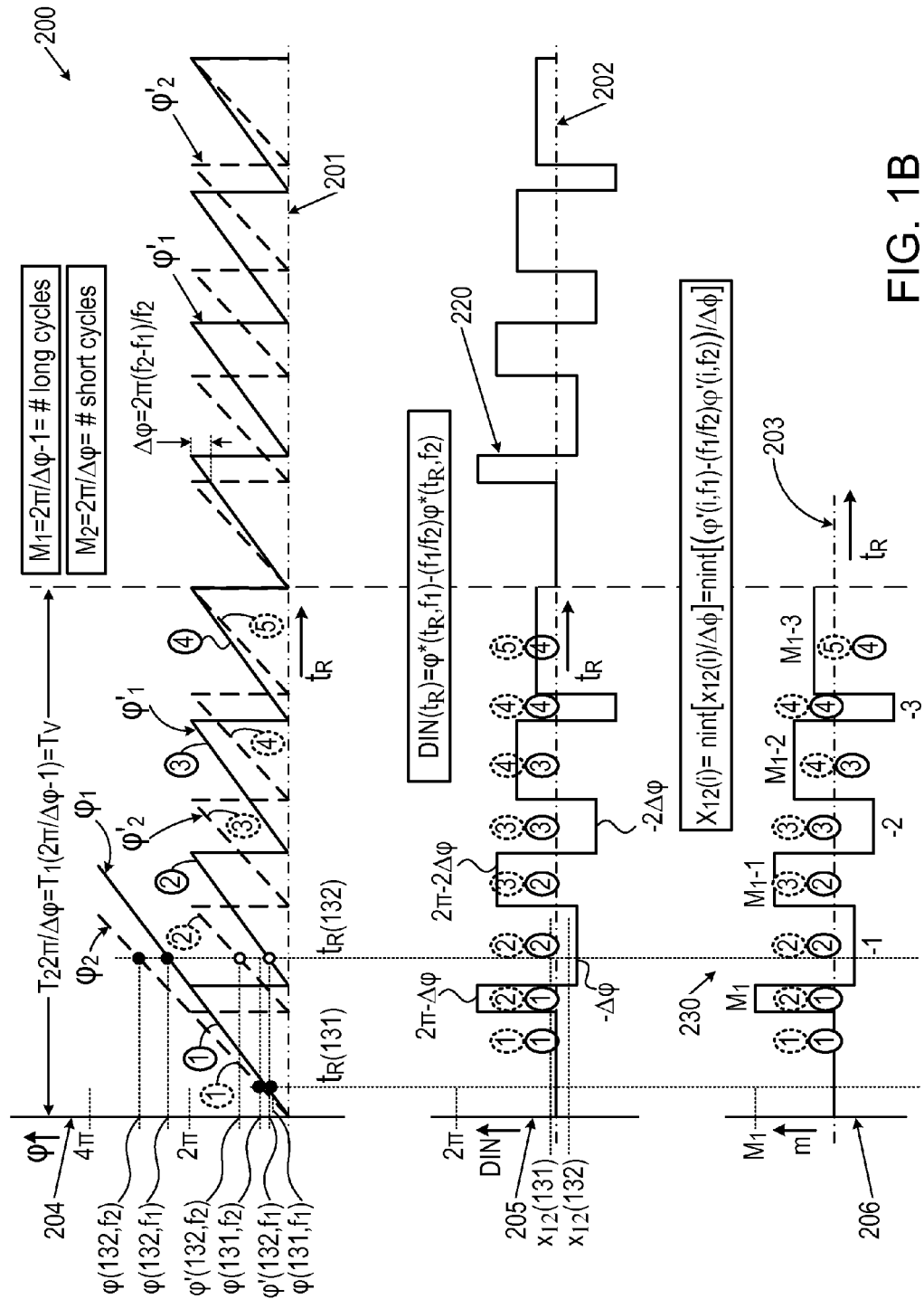
FIG. 1B shows graphs illustrating relationships of the first and second frequencies to the DIN and its discrimination values in accordance with an embodiment of the disclosure.
Figure 2:
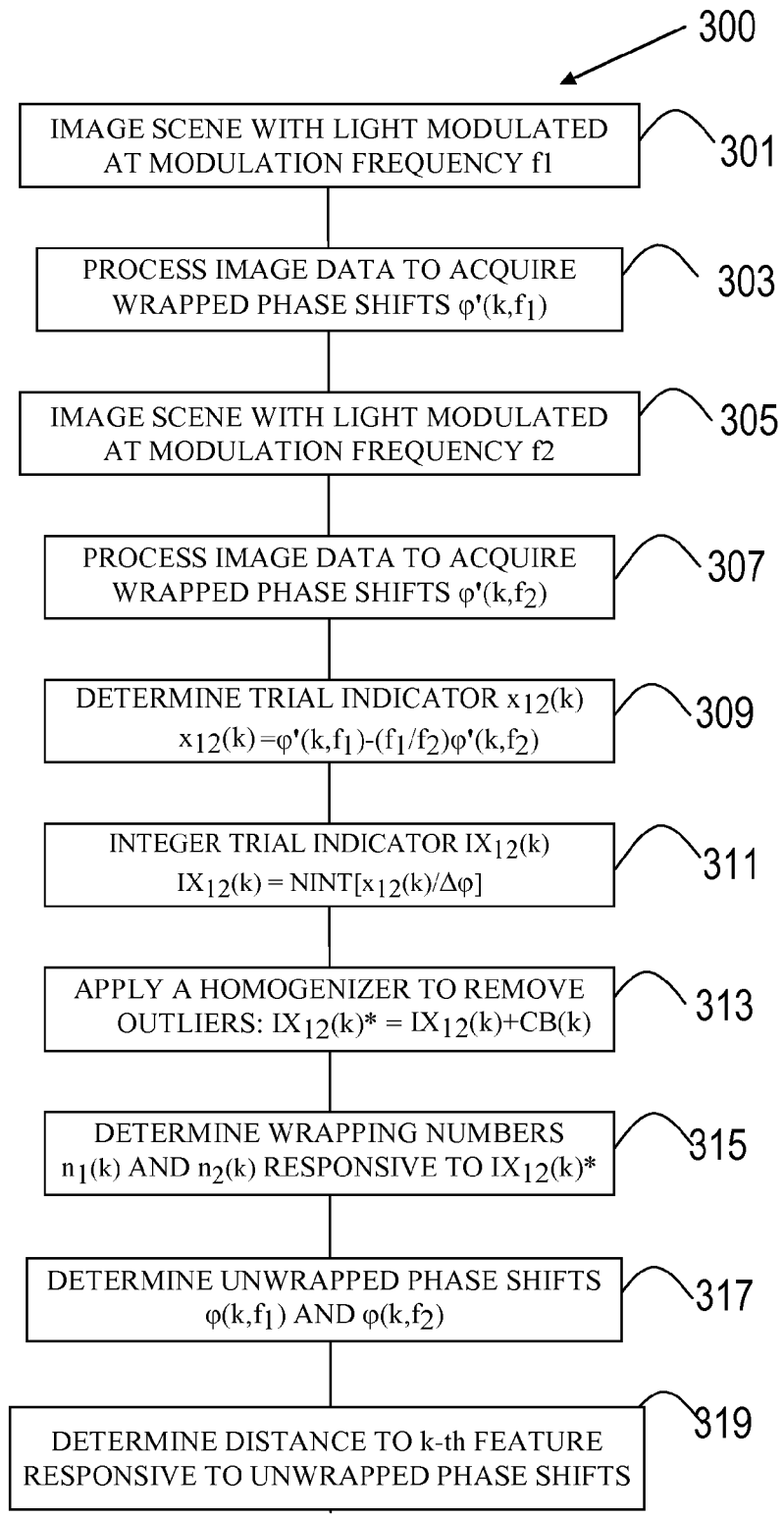
FIG. 2 shows a flow chart of a process by which the CW-TOF camera shown in FIG. 1A unwraps wrapped phase shifts and determines distances to features in the scene, in accordance with an embodiment of the disclosure.

FIG. 1A shows a graph of a $DIN(t_R)$ function that a processor comprised in the CW-TOF camera uses to distinguish wrapping numbers of wrapped phases of light reflected from features in the scene in accordance with an embodiment of the disclosure. FIG. 1B shows graphs that detail form of a $DIN(t_R)$ and how it may be used to determine wrapping numbers, in accordance with an embodiment of the disclosure. FIG. 2 shows a flow diagram of an algorithm for unwrapping phase shifts of reflected light from features in a scene and determining distances to the features responsive to the unwrapped phase shifts in accordance with an embodiment of the disclosure.

Hereinafter, a wrapped phase shift may be denoted by a primed symbol and its corresponding unwrapped, or real phase shift by the unprimed symbol. A real phase shift for a given modulation frequency f and a given feature in a scene may be referred to as a physical phase shift, is equal to $2\pi ft_R = 4\pi df/c$. A range of distances $0 \leq d < c/2f$, for which a phase shift wrapping number n is equal to zero is said to be a range for which a CW-TOF camera provides unambiguous phase shifts may be referred to as an unambiguous depth range of the CW-TOF camera. The unambiguous depth range has a maximum, unambiguous, range equal to $c/2f$.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

FIG. 1A schematically shows a CW-TOF camera 20 operating to determine distances to features in a scene 30 having objects 31 and 32, in accordance with an embodiment of the disclosure. CW-TOF camera 20, which is represented very schematically, comprises an optical system represented by a lens 21, and a photosensor 22 having pixels 23 on which the lens system images scene 30. The CW-TOF camera optionally comprises a light source 26 and a controller 24 that controls light source 26 and optionally photosensor 22. Controller 24 controls light source 26 to illuminate scene 30 with continuously modulated light from which features in the scene reflect light back to CW-TOF camera 20. The controller controls pixels 23 to register the reflected light to provide data for determining wrapped phase shifts for features in scene 30 and therefrom distances to the features. A processor 25 receives the data that pixels 23 provide and processes the data to acquire and process wrapped phase shifts for features in scene 30 in accordance with an embodiment of the disclosure as described below to determine distances to the features.

A pixel in a camera photosensor, such as a pixel 23 in photosensor 22, registers incident light by accumulating positive or negative electric charge, also referred to as "photocharge", provided by electron-hole pairs generated by photons in the incident light. Circuitry in the TOF camera converts photocharge accumulated by the pixels into voltages that are used as measures of the amounts of photocharge they respectively accumulate. A set of voltages representing the accumulated photocharges and corresponding amounts of light registered by the pixels may be referred to as a "frame" of the photosensor. Acquiring a frame of a photosensor may be referred to as "reading" the photosensor, reading the pixels, or reading the photocharge in the pixels. An amount of light that a pixel registers may refer to an amount of optical energy incident on the pixel, an amount of photocharge accumulated by a pixel responsive to incident light, or to a voltage generated responsive to the accumulated photocharge.

Photosensor 22 may be any photosensor controllable by controller 24 to register light reflected by features in scene 30 and thereby provide data sufficient to determine the wrapped phase shifts and therefrom distances to the features, in accordance with an embodiment of the disclosure. For each modulation frequency, controller 24 may by way of example, control exposure periods of pixels 23 in photosensor 22 to sample and register reflected light incident on the pixels at a sampling frequency equal to the modulation frequency of the transmitted light for each of a plurality of fixed sampling "phase offsets" relative to the modulation of the transmitted light. An amount of light from a given feature in scene 30 registered by a pixel in photosensor 22 for each of the phase offsets is proportional to a cross-correlation of the reflected light from the given feature with the exposure periods of the photosensor for the sampling phase offset. Optionally, CW-TOF camera 20 may use four offset phases, equal respectively to 0, $\pi/2$, $\pi$, and $3/2\pi$ to determine the wrapped phase shift $\phi'$ and therefrom distance d to a feature in a scene that the CW-TOF camera images. Let Q1, Q2, Q3, and Q4 respectively represent amounts of photocharge accumulated for cross-correlations of reflected light from the feature and exposure periods of pixels in the photosensor for the four sampling phase offsets. The phase shift $\phi'$ may then be determined from an expression $\phi' = \arctan[(Q3-Q4)/(Q1-Q2)]$.

To acquire the four photocharge accumulations Q1, Q2, Q3, and Q4, for features in scene 30 each feature may by way of example, simultaneously be imaged on four adjacent pixels 23 of photosensor 22, each of which controller 24 controls to acquire a photocharge accumulation representing a cross-correlation for a different one of the four sampling phase shifts. Optionally, controller 24 controls CW-TOF camera 20 to image scene 30 four times, once for each sampling phase offset, to provide four frames of its photosensor 22 to acquire the four photocharges Q1, Q2, Q3, and Q4 for features in the scene. By way of yet another example, pixels 23 that photosensor 22 controls may be CMOS smart pixels configured as photonic mixer devices (PMDs), each of which controller 24 controls to register reflected light from a feature of scene 30 at a plurality of different offset phases. The controller may read the light registered by the PMD pixels in a single frame of photosensor 22.

It is noted that whereas controller 24 and processor 25 are schematically indicated in FIG. 1A as separate modules, they may be provided by a same single module and/or any combination of suitable processing circuitry. Controller 24 and processor 25 may, comprise and/or have any of their respective functionalities provided by any combination of suitable circuitry such as by way of example, microprocessors, microcontrollers, application specific integrated circuits (ASICs), field programmable gate arrays (FPGA), multichip module (MCM) and/or system on a chip (SOC).

In an embodiment of the disclosure, controller 24 controls light source 26 to transmit light having intensity modulated at a first frequency $f_1$ to illuminate scene 30 and light modulated at a second, higher frequency $f_2$, to illuminate the scene. Light transmitted by light source 26 modulated at the first, lower frequency $f_1$ is schematically represented by a solid "harmonically" modulated line labeled 40 with frequency $f_1$ shown in parenthesis. Modulated line 40 has a relatively large modulation wavelength to visually indicate that it is associated with the lower frequency modulation. Light transmitted by light source 26 modulated at frequency $f_2$ is schematically represented by a solid "harmonically" modulated line labeled 50 with frequency $f_2$ shown in parenthesis. Modulated line 50 has a relatively small modulation wavelength to visually indicate that it is associated with the higher frequency modulation.

Light reflected from transmitted light waves 40 and 50 back to CW-TOF camera 20 by features in scene 30 is imaged on pixels 32 of photosensor 22 by lens 21 to determine phase shifts for the reflected light that may be used to determine distances to the features in accordance with an embodiment of the disclosure. The phase shifts are determined for each modulation frequency $f_1$ and $f_2$ optionally relative to a phase of the modulation of the transmitted light at times at which the reflected light reaches photosensor 22.

In FIG. 1A light reflected from transmitted light 40 and 50 by light source 26 to illuminate scene 30 is schematically shown for two features in the scene, features 131 and 132 of objects 31 and 32 respectively. Light reflected by feature 131 from lower frequency transmitted light 40 and higher frequency transmitted light 50 is schematically represented, by dotted lines 41 and 51 having directional arrows pointing towards camera 20. Lines 41 and 51 have relatively large and relatively small modulation wavelengths respectively, to indicate that they represent reflected light modulated at lower and higher modulation frequencies $f_1$ and $f_2$. Similarly, light reflected by feature 132 from transmitted light 40 and 50 by feature 132 is schematically represented by dotted lines 42 and 52 respectively having directional arrows pointing towards camera 20. Lines 42 and 52 are shown having relatively small and relatively large modulation wavelengths to indicate their respective association with the lower and higher modulation frequencies $f_1$ and $f_2$.

Light from features 131 and 132 is imaged by lens 21 on pixels 23 distinguished by labels 231 and 232 respectively, and reflected light 41 and 42 from features 131 and 132 incident on the pixels is respectively, schematically indicated by dotted lines, also labeled 41 and 42, that extend from lens 21 toward pixels 231 and 232. Reflected light 51 and 52 from features 131 and 132 is also imaged on pixels 231 and 232 respectively but is not schematically shown imaged on the pixels to reduce clutter of the figure.

Modulation of transmitted light 40 at frequency $f_1$, and phase of transmitted light 40 transmitted at times at which reflected light 41 and 42 reach pixels 131 and 132 is schematically indicated by solid "harmonic" lines 40* at the pixels. A real phase shift, $\phi(131,f_1)$, between modulation phase of transmitted light 40 modulated at modulation frequency $f_1$ and reflected light 41 due to a round trip time from light source 26 to feature 131 and back to camera 20 is schematically indicated at pixel 231 by a distance between witness lines labeled $\phi(131,f_1)$. Similarly, a real phase shift $\phi(132,f_1)$ between modulation phase of transmitted light 40 and reflected light 42 due to a round trip time from light source 26 to feature 132 and back to camera 20 is schematically indicated at pixel 132 by a distance between witness lines labeled $\phi(132,f_1)$. Phase shifts $\phi(131,f_1)$ and $\phi(132,f_1)$ and their associated witness lines are schematically shown in a same column one above the other for clarity of presentation and ease of comparison in an inset 100.

By way of example, feature 132 is assumed to be farther from CW-TOF camera 20 by a distance $\Delta d_1 = c/2f_1$. As a result, $\phi(132,f_1)$ is greater than $\phi(131,f_1)$ by $2\pi$ as shown in inset 100. However, photocharge that a given pixel of a CW-TOF camera accumulates responsive to a cross-correlation of the camera's exposure periods with reflected light from a feature in a scene that the pixel images is the same to within a multiplicative constant for a distance d of the feature from the camera and for a distance $(d+nc/2f)$ from the camera, where n is any integer equal to or greater than 1. As a consequence, a CW-TOF camera maps real phase shifts $\phi = (4\pi df/c + n2\pi)$ corresponding to distances $(d+nc/2f)$ of features in a scene to wrapped phase shifts $\phi' = 4\pi df/c$ corresponding to distances $0 \leq d < c/2f$. The wrapped phase shifts acquired by the CW-TOF camera are therefore ambiguous with respect to distances from the CW-TOF camera, and a given wrapped phase shift may for example refer to a distance $(d+nc/2f)$ for any n equal to or greater than 0. CW-TOF camera 20 therefore maps real phase shifts $\phi(132,f_1)$ and $\phi(131,f_1)$ to wrapped phase shifts $\phi'(132,f_1)$ and $\phi'(131,f_1)$ respectively, which are less than $2\pi$ and, for the assumed circumstances of features 131 and 132, equal. Without unwrapping, $\phi'(132,f_1)$ and $\phi'(131,f_1)$, even though they are generated from different real phase shifts are not distinguished by a CW-TOF camera. The wrapped phase shifts are ambiguous, and distances determined responsive to the phase shifts are determinate only to within an integer multiple of distance $\Delta d_1$.

Phase shifts $\phi(131,f_2)$ and $\phi(132,f_2)$ between modulation phase of transmitted light 50 modulated at modulation frequency $f_2$ and phase of reflected light 51 and 52 from features 131 and 132 respectively at pixels 231 and 232 are also schematically shown in a same column, one above the other in inset 100. Phase of transmitted light 50 for times at which reflected light 51 and 52 reach pixels 231 and 232 is schematically represented by solid harmonic lines 50* in inset 100. Whereas phase shifts $\phi(131,f_2)$ and $\phi(132,f_2)$ are larger than phase shifts $\phi(131,f_1)$ and $\phi(132,f_1)$ respectively because $f_2$ is larger than $f_1$, phase shifts $\phi(131,f_2)$ and $\phi(132,f_2)$ are mapped to wrapped phase shifts $\phi'(131,f_2)$ and $\phi'(132,f_2)$, both of which are less than $2\pi$. Wrapped phase shifts $\phi'(131,f_2)$ and $\phi'(132,f_2)$, similarly to wrapped phase shifts $\phi'(131,f_1)$ and $\phi'(132,f_1)$, are ambiguous with respect to distances of features 131 and 132 from camera 20 and without unwrapping, distances determined responsive to the wrapped phase shifts are indeterminate to within an integer multiple of $\Delta d_2 = c/2f_2$.

To unwrap phase shifts for reflected light at modulation frequency $f_1$ and/or modulation frequency $f_2$ acquired by CW-TOF camera 20 for a feature, such as feature 131 or feature 132, in scene 30 and determine a distance to the feature, in accordance with an embodiment of the disclosure, processor 25 processes the phase shifts to provide a trial indicator for a DIN function of the phase shifts. Processor 25 determines a DIN value and therefrom a wrapping number for at least one of the phase shifts acquired for the feature responsive to the trial indicator and the DIN, and uses the wrapping number to determine an unwrapped phase shift for the feature and therefrom a distance to the feature.

Let $\phi^*(t_R,f_1)$ represent a "theoretical" wrapped phase shift for reflected light from a feature in scene 30 for light modulated at frequency $f_1$ and a distance of the feature from CW-TOF camera 20 for which a round trip time of light to the feature and back to the camera is equal to "$t_R$". The theoretical wrapped phase shift is equal to a real phase shift $\phi$ for $t_R$ modulo $2\pi$. Let $\phi^*(t_R,f_2)$ represent the theoretical wrapped phase shift of the feature for light modulated at modulation frequency $f_2$. In an embodiment of the disclosure, a discretized DIN function for CW-TOF camera 20 that processor 25 uses to unwrap wrapped phase shifts acquired by CW-TOF camera 20 for features of scene 30 may be defined by an expression of the form $DIN(t_R) = (\alpha \phi^*(t_R,f_1) - \beta \phi^*(t_R,f_2))$ where $\alpha$ and $\beta$ are constants that optionally have a same sign.

In an embodiment, $\beta/\alpha = f_1/f_2$ and $DIN(t_R) = \phi^*(t_R,f_1) - (f_1/f_2) \phi^*(t_R,f_2)$. By choosing $\beta/\alpha = f_1/f_2$ in accordance with an embodiment of the disclosure $DIN(t_R)$ is a function substantially only of the wrapping numbers of $\phi^*(t_R,f_1)$ and $\phi^*(t_R,f_2)$ and assumes discrete DIN values separated by integer multiples of a phase difference $\Delta\phi=2\pi(f_2-f_1)/f_2$.

The piecewise constant step function form of $DIN(t_R)$ and differences between steps of the function may be demonstrated by noting that for a same round trip time $t_R$, real phase shifts $\phi(t_R,f_1)$ and $\phi(t_R,f_2)$ for a given feature in scene 30 have a ratio $\phi(t_R,f_1)/\phi(t_R,f_2)=(f_1/f_2)$. A theoretical wrapped phase shift $\phi^*(t_R,f_1)$ may be written $\phi^*(t_R,f_1)=(\phi(t_R,f_1)-n_1 2\pi)$, where $n_1$ is a wrapping number that relates the real phase shift $\phi(t_R,f_1)$ to its theoretical wrapped phase shift $\phi^*(t_R,f_1)$. Similarly $\phi^*(t_R,f_2)=(\phi(t_R,f_2)-n_2 2\pi)$ where $n_2$ is a wrapping number that relates real phase shift $\phi(t_R,f_2)$ to theoretical wrapped phase shift $\phi^*(t_R,f_2)$. $DIN(t_R)$ may therefore be expressed as $DIN(t_R)=[\phi(t_R,f_1)-n_1 2\pi]-(f_1/f_2)[\phi(t_R,f_2)-n_2 2\pi]$, which may be rewritten $DIN(t_R)=[\phi(t_R,f_1)-(f_1/f_2)\phi(t_R,f_2)]-2\pi((n_1-(f_1/f_2)n_2)$. Since $\phi(t_R,f_1)/\phi(t_R,f_2)=(f_1/f_2)$ the expression for $DIN(t_R)$ reduces to $DIN(t_R)=2\pi[(f_1/f_2)n_2-n_1]$. Let $\Delta n=(n_2-n_1)$. Then $DIN(t_R)=\Delta n(2\pi-\Delta\phi)-n_1\Delta\phi$. The last expression for $DIN(t_R)$ shows that $DIN(t_R)$ is, to within the constant coefficient $2\pi$ a function of wrapping numbers $n_1$ and $n_2$ ($\Delta n=(n_2-n_1)$) and assumes discrete DIN values separated by integer multiples of the phase difference $\Delta\phi=2\pi(f_2-f_1)/f_2$.

In an embodiment, $f_1/f_2=M/(M+1)$, $\Delta n$ is either equal to 0 or 1 and $DIN(t_R)$ has interleaved positive and negative values. Consecutive positive values differ by $\Delta\phi$ and consecutive negative values differ by $\Delta\phi$. $DIN(t_R)$ is cyclical, repeating itself every $M_2=2\pi/\Delta\phi=f_2/(f_2-f_1)$ periods of the high, $f_2$, modulation frequency of transmitted light wave 50, and every $M_1=2\pi/\Delta\phi-1=f_1/(f_2-f_1)$ periods of the low, $f_1$, modulation frequency of transmitted light wave 40. Different wrapping numbers for wrapped phase shift $\phi^*(t_R,f_1)$, from and inclusive of zero, up to and inclusive of a maximum wrapping number $(M_1-1)$ are associated with different DIN values of $DIN(t_R)$. Similarly, different wrapping numbers for wrapped phase shift $\phi^*(t_R,f_2)$, from and inclusive of zero, up to and inclusive of a maximum wrapping number $(M_2-1)$ are associated with different DIN values of $DIN(t_R)$. A graph of $DIN(t_R)$ for $f_1/f_2=\frac{4}{5}$ is shown in processor 25 of FIG. 1A and also in FIG. 1B discussed below. In the graph, steps in $DIN(t_R)$ are labeled with their respective DIN values and step size $\Delta\phi$ of the DIN values is indicated.

Processor 25 determines a trial indicator for use with $DIN(t_R)$ to determine a distance to a feature in scene 30 from wrapped phase shifts for modulation frequencies $f_1$ and $f_2$ acquired by CW-TOF camera 20 responsive to light reflected by the feature from transmitted light wave 40 and transmitted light wave 50. If a trial indicator for a feature in scene 30 for frequencies $f_1$ and $f_2$ is represented by "$x_{12}(k)$", where "k" is an index identifying the feature, and wrapped phase shifts for the feature for light reflected by the feature from light waves 40 and 50 are represented by $\phi'(k,f_1)$ and $\phi'(k,f_2)$, then $x_{12}(k)$ is optionally determined from an expression $x_{12}(k)=\phi'(k,f_1)-(f_1/f_2)\phi'(k,f_2)$. The processor optionally compares the trial indicator to $DIN(t_R)$ to determine a phase shift for a wrapped phase shift for the feature and therefrom a distance to the feature.

For example, for features 131 and 132 imaged on pixels 231 and 232, trial indicators may be written $x_{12}(131)=\phi'(131,f_1)-(f_1/f_2)\phi'(131,f_2)$ and $x(132)=\phi'(132,f_1)-(f_1/f_2)\phi'(132,f_2)$. The expressions for $x_{12}(131)$ and $x_{12}(132)$ are shown in FIG. 1A in processor 25. As schematically indicated in inset 100, real phase shifts $\phi(131,f_1)$ and $\phi(131,f_2)$ are both less than $2\pi$. As a result, the wrapping numbers $n_1$ and $n_2$ of their respective wrapped phase shifts $\phi'(131,f_1)$ and $\phi'(131,f_2)$ are both equal to zero and a ratio their respective theoretical phase shifts $\phi^*(132,f_1)/\phi^*(132,f_2)$ is equal to $(f_1/f_2)$. Were wrapped phase shifts $\phi'(131,f_1)$ and $\phi'(131,f_2)$ determined with zero error, they would be equal respectively to their theoretical phase shifts $\phi^*(132,f_1)$ and $\phi^*(132,f_2)$, and trial indicator $x_{12}(131)$ would be equal to zero. Real phase shifts $\phi(132,f_1)$ and $\phi(132,f_2)$ are indicated in inset 100 having values between $2\pi$ and $4\pi$. Wrapped phase shifts $\phi'(132,f_1)$ and $\phi'(132,f_2)$ corresponding to real phase shifts $\phi(132,f_1)$ and $\phi(132,f_2)$ therefore have wrapping numbers $n_1$ and $n_2$ respectively equal to 1. Were wrapped phase shifts $\phi'(132,f_1)$ and $\phi'(132,f_2)$ determined with zero error, they would be equal respectively to their theoretical phase shifts $\phi^*(132,f_1)=[\phi(132,f_1)-2\pi]$ and $\phi^*(132,f_2)=[\phi(132,f_2)-2\pi]$. Their trial indicator $x(132)$ would be equal to $x(132)=[\phi(132,f_1)-2\pi]-(f_1/f_2)[\phi(132,f_2)-2\pi]=[\phi(132,f_1)-(f_1/f_2)\phi(132,f_2)]-2\pi[1-(f_1/f_2)]=-\Delta\phi$.

However, because in practice phase shift measurements are not performed without error, trial indicators $x_{12}(131)$ and $x_{12}(132)$ are not exactly equal to 0 and $-\Delta\phi$ respectively, but are biased by errors. Values of trial indicators $x_{12}(131)$ and $x_{12}(132)$, which are schematically represented by solid dots 141 and 142 along the ordinate of the graph of $DIN(t_R)$ in processor 25, are therefore indicated in the graph, by way of example, as displaced along the ordinate from their error free values.

Whereas values for trial indicators $x_{12}(131)$ and $x_{12}(132)$ are not error free, and are not equal to their error free values, processor 25 determines, using any of various suitable criteria, that $x_{12}(131)$ and $x_{12}(132)$ are closest to, and should be associated with, DIN values 0 and $-\Delta\phi$. DIN value 0 is associated with wrapping numbers $n_1=0$ and $n_2=0$. DIN value $-\Delta\phi$ is associated with wrapping numbers $n_1=1$ and $n_2=1$ respectively. As a result, processor 25 assigns wrapped phase shifts $\phi'(131,f_1)$ and $\phi'(131,f_2)$ wrapping numbers equal to zero and wrapped phase shifts $\phi'(132,f_1)$ and $\phi'(132,f_2)$ wrapping numbers equal to one. The processor uses at least one wrapped phase and its associated wrapping number acquired for each feature 131 and 132 to determine a distance to the feature. For example, processor 25 may determine distance $d_{131}$ to feature 131 from an expression $d_{131}=\phi'(131,f_1)c/4\pi f_1$, and distance $d_{132}$ to feature 132 from an expression $d_{132}=[\phi'(132,f_2)+2\pi]c/4\pi f_2$.

FIG. 1B shows a graph 200 that illustrates relationships between modulation frequencies $f_1$, $f_2$, $DIN(t_R)$ and wrapping numbers for wrapped phase shifts acquired by CW-TOF camera 20 for features in scene 30, in accordance with an embodiment of the disclosure. The graph has three round trip time axes 201, 202, and 203 along which round trip times $t_R$ to features in scene 30 are indicated as measured. Round trip axes 201, 202, and 203 are calibrated and aligned to each other, and same round trip times $t_R$ on any two of the axes are homologous.

Solid and dashed phase shift graph lines $\phi_1$ and $\phi_2$ along round trip axis 201 indicate real phase shifts for features in scene 30 as functions of $t_R$ for reflected light at modulation frequencies $f_1$ and $f_2$ respectively. Values of real phase shifts for points along real phase shift graph lines $\phi_1$ and $\phi_2$ corresponding to round trip times $t_R$ along round trip axis 201 are shown along an ordinate, phase shift axis 204. Values of wrapped phase shifts along phase shift axis 204 are primed. Values of real phase shifts are unprimed. Round trip times $t_R(131)$ and $t_R(132)$ for features 131 and 132 in scene 30 (FIG. 1A) respectively are indicated along round trip time axis 201. Points on phase shift graph lines $\phi_1$ and $\phi_2$ corresponding to round trip times $t_R(131)$ and $t_R(132)$ are indicated by intersection points of the phase shift graph lines with lines parallel to ordinate axis 204 that pass through the round trip times. The intersection points are emphasized by solid circles and their corresponding real phase shifts ϕ(132, $f_2$), ϕ(132,$f_1$), ϕ(131,$f_2$), and ϕ(131,$f_1$) are labeled along phase shift axis 204.

Because photosensor 22 (FIG. 1A) provides data that defines real phase shifts for light modulated at modulation frequencies $f_1$ and $f_2$ modulo $2\pi/f_1$ and $2\pi/f_2$ respectively, real phase shifts that are greater than $2\pi$ represented by points on phase shift graph lines $\phi_1$ and $\phi_2$ are mapped to wrapped phase shifts represented by projections of the points on graph lines $\phi_1$ and $\phi_2$ to points on saw-tooth phase shift graph lines $\phi'_1$ and $\phi'_2$ respectively. As a result, every real phase shift greater than $2\pi$ along phase shift graph line $\phi_1$ and $\phi_2$ is mapped to a wrapped phase shift of a "phase tooth" of saw-tooth phase shift lines $\phi'_1$ and $\phi'_2$ respectively, and is less than $2\pi$.

Phase teeth in saw-tooth phase shift graph line $\phi'_1$ are numbered by numbers $m_1$ shown in solid line ellipses. Phase teeth in saw-tooth phase shift graph line $\phi'_2$ are numbered by numbers $m_2$ shown in dotted line ellipses. In FIG. 1B, as in FIG. 1A, $f_1/f_2$ is assumed to be equal to ⅘. As a result, $\Delta\phi=2\pi(f_2-f_1)/f_2=2\pi/5$ and saw-tooth graph line $\phi'_2$ has $M_2=2\pi/\Delta\phi=5$ teeth ($1 \le m_2 \le M_2$) and saw-tooth graph line $\phi'_1$ has $M_1=2\pi/\Delta\phi-1=4$ teeth ($1 \le m_1 \le M_1$) before their pattern of saw teeth repeat.

An $m_1$-th phase tooth in saw-tooth phase shift graph line $\phi'_1$ maps a real phase shift for modulation frequency $f_1$ along phase shift graph line $\phi_1$ between a real phase shift equal to $2\pi(m_1-1)$ and a real phase shift less than $2\pi m_1$ to an ambiguous, wrapped phase shift having a wrapping number $n=(m_1-1)$. Similarly, an $m_2$-th phase tooth in saw-tooth phase shift graph line $\phi'_2$ maps a real phase shift for modulation frequency $f_2$ along phase shift graph line $\phi_2$ between a real phase shift equal to $2\pi(m_2-1)$ and a real phase shift less than $2\pi m_2$ to an ambiguous wrapped phase shift having a wrapping number $n=(m_2-1)$. It is noted that whereas real phase shifts less than $2\pi$ are mapped to their real values by photosensor 22, they are in fact generally ambiguous because their values might have been generated by a real phase shift greater than $2\pi$.

By way of example, real phase shift ϕ(132,$f_1$) shown along real phase shift graph line $\phi_1$ is mapped to wrapped phase shift ϕ'(132,$f_1$) indicated by a point along phase tooth $m_1=2$ (number 2 in a solid line ellipse) of saw-tooth phase shift graph line $\phi_1$ by an open circle. The open circle is labeled, and its value indicated by ϕ'(132,$f_1$) shown along phase shift axis 204. Similarly, real phase shift ϕ(132,$f_2$) shown along real phase shift graph line $\phi_2$ is mapped to wrapped phase shift ϕ'(132,$f_2$) indicated by a point on phase tooth $m_2=2$ (number 2 in a dashed line ellipse) of saw-tooth phase shift graph line $\phi'_2$ by an open circle. The open circle is labeled, and its value indicated by ϕ'(132,$f_2$) shown along phase shift axis 204. Real phase shifts ϕ(131,$f_1$) and ϕ(131,$f_2$) indicated by solid circles along real phase shift graph lines $\phi_1$ and $\phi_2$ are by way of example, equal to and coincident with their respective wrapped phase shifts ϕ'(131,$f_1$) and ϕ'(131,$f_2$) on phase teeth $m_1=1$ of saw-tooth phase shift graph lines $\phi'_1$ and $\phi'_2$. Wrapped phase shifts ϕ'(131,$f_1$) and ϕ'(131,$f_2$) are therefore not distinguished from real phase shifts ϕ(131,$f_1$) and ϕ(131,$f_2$) along phase shift graph lines $\phi'_1$ and $\phi'_2$.

Discretized indicator function, $DIN(t_R)=\phi^*(t_R,f_1)-(f_1/f_2)\phi^*(t_R,f_2)$ discussed above as optionally used to unwrap wrapped phase shifts in accordance with an embodiment of the disclosure is shown as a function of $t_R$ along round trip axis 202. Values for $DIN(t_R)$ are indicated as being shown along an ordinate DIN axis 205. $DIN(t_R)$ may assume discrete step values, "DIN values", for which a first DIN value is equal to zero and subsequent DIN values alternate between positive and negative values. The positive DIN values and negative DIN values decrease monotonically with increasing $t_R$ with a difference between sequential positive DIN values and between sequential negative DIN values equal to $\Delta\phi=2\pi(f_2-f_1)/f_2$.

For a ratio $f_1/f_2=M/(M+1)$ where M is an integer, each of the DIN values is equal to a different integer multiple of $\Delta\phi$. Each DIN value is associated with only one tooth number $m_1$ and only one tooth number $m_2$. Some of the DIN values are labeled by their values, and each DIN value shows, in a solid ellipse, a tooth number $m_1$ of the tooth in phase tooth graph line $\phi'_1$ with which the DIN number is associated, and, in a dashed ellipse, a tooth number $m_2$ of the tooth in phase tooth graph line $\phi'_2$ with which the DIN value is associated. Every tooth number $m_1$ in saw-tooth phase shift graph line $\phi'_1$, up to and inclusive of maximum tooth number $M_1$ is associated with a different DIN value. Similarly, every tooth number $m_2$ in saw-tooth phase shift graph line $\phi'_2$, up to and inclusive of maximum tooth number $M_2$ is associated with a different DIN value.

By comparing a trial indicator for a given wrapped phase shift to DIN values of $DIN(t_R)$, in accordance with an embodiment of the disclosure, CW-TOF camera 20 associates the wrapped phase shift with a particular phase tooth number $m_1$ and a particular phase tooth number $m_2$. The phase tooth numbers $m_1$ and $m_2$ associated with the wrapped phase shift provide wrapping numbers $n_1=(m_1-1)$ and $n_2=(m_2-1)$ for the wrapped phase shift for modulation frequency $f_1$ and modulation frequency $f_2$ respectively.

For example, a possible value for trial indicator $x_{12}(\textbf{131})$ for feature 131 determined from wrapped phase shifts ϕ'(131,$f_1$) and ϕ'(131,$f_2$) is shown along DIN axis 205. Wherein, as in FIG. 1A, $x_{12}(\textbf{131})$ is shown having a value larger than 0, the value of $x_{12}(\textbf{131})$ is closest to the DIN value of $DIN(t_R)$ equal to zero, and processor 25 associates $x_{12}(\textbf{131})$ with $DIN(t_R)$ equal to zero for which $m_1=m_2=1$. As a result, processor 25 determines that both wrapped phase shifts ϕ'(131,$f_1$) and ϕ'(131,$f_2$) have their respective wrapping numbers $n_1=(m_1-1)$ and $n_2=(m_2-1)$ equal to zero. The processor may therefore determine a distance d(131) to feature 131 responsive to a distance $d(\textbf{131},f_1)=\phi'(\textbf{131},f_1)c/4\pi f_1$ and/or a distance $d(\textbf{131},f_2)=\phi'(\textbf{131},f_2)c/4\pi f_2$. Distance d(131) may for example be determined equal to a distance $d(\textbf{131},f_1)$ or $d(\textbf{131},f_2)$ having a smallest, estimated standard deviation, or average, or weighted average of the distances.

Similarly, processor 25 determines that $x_{12}(\textbf{132})$ schematically shown along DIN axis 205, is closest to the DIN value of $DIN(t_R)$ equal to $-\Delta\phi$ and associates $x_{12}(\textbf{132})$ with phase tooth number $m_1=2$ and $m_2=2$. The processor may therefore determine that wrapped phase ϕ'(131,$f_1$) and wrapped phase ϕ'(131,$f_2$) have wrapping numbers equal to 1 and determines a distance d(132) to feature 132 responsive to a distance $d(\textbf{131},f_1)=[\phi'(\textbf{132},f_1)+2\pi]c/4\pi f_1$ and/or a distance $d(\textbf{132},f_2)=[\phi'(\textbf{132},f_2)+2\pi]c/4\pi f_1$.

In an embodiment of the disclosure $DIN(t_R)$ may be configured as an integer function for which its DIN values are integer, for example, by quantizing $[\phi^*(t_R,f_1)-(f_1/f_2)\phi^*(t_R,f_2)]$ with a quantization step equal to $\Delta\phi$, and defining $DIN(t_R)=nint([\phi^*(t_R,f_1)-(f_1/f_2)\phi^*(t_R,f_2)]/\Delta\phi)$ where "nint" is the nearest integer function. $DIN(t_R)$ defined as an integer function has a maximum value equal to $M_1$ and positive and negative integer values that decrease monotonically with $t_R$ by units of one. An integer $DIN(t_R)$ 230 corresponding to $DIN(t_R)$ shown along round trip axis 201 is shown along round trip axis 203. Processor 25 may use a trial integer indicator to compare with integer $DIN(t_R)$, in accordance with an embodiment of the disclosure, to determine wrapping numbers for wrapped phase shifts acquired by CW-TOF camera 20. An integer trial indicator for a k-th feature may be defined as $IX_{12}(k)=\text{nint}[(x_{12}(k)/\Delta\phi]=\text{nint}[(\phi'(k,f_1)-(f_1/f_2)\phi'(k,f_2))/\Delta\phi]$.

An integer $DIN(t_R)$ and integer trial function $IX_{12}(k)$ may be advantageous in performing calculations useful for determining wrapping numbers in accordance with an embodiment of the disclosure. For example, if $DIN(t_R)$ is an integer function, an integer value of $IX_{12}(k)$ is equal to a DIN value for the k-th feature in scene 30 from which corresponding wrapping numbers for wrapped phase shifts acquired for the feature may be determined.

It is noted that in the above examples, wrapped phase shifts for a same feature 131 or 132 are described as having a same wrapping number. Wrapping numbers for wrapped phases acquired for modulation frequencies $f_1$ and $f_2$ and a same feature do not of course have to be the same. For example, if processor 25 had determined from a value of trial indicator $x_{12}(\mathbf{132})$ that the trial indicator should be associated with DIN value equal to $(2\pi-2\Delta\phi)$, the processor would have determined that wrapped phase $\phi'(\mathbf{132},f_1)$ is associated with phase tooth number 2 and that wrapped phase $\phi'(\mathbf{132},f_2)$ is associated with phase tooth number 3. The processor would have determined that wrapped phases $\phi'(\mathbf{132},f_1)$ and $\phi'(\mathbf{132},f_2)$ have wrapping numbers $n_1=1$ and $n_2=2$ respectively.

The discretized indicator function $DIN(t_R)$ as noted above, and as shown in FIG. 1B is cyclical. The function has a repetition period equal to $(2\pi/\Delta\phi-1)T_1=(2\pi/\Delta\phi)T_2$, where $T_1$ and $T_2$ are periods of frequencies $f_1$ and $f_2$ respectively, and a corresponding repetition frequency equal to a beat frequency, $f_B=(f_2-f_1)$. CW-TOF camera 20 using light modulated at modulation frequencies $f_1$ and $f_2$ and $DIN(t_R)$ to determine distances to features in scene 30 in accordance with an embodiment of the disclosure, provides unambiguous phase shifts for features in scene 30 located up to a maximum distance from the camera equal to $c/2(f_2-f_1)$. The CW-TOF camera operates as if it illuminates the scene with light having intensity modulated at a "virtual modulation frequency" equal to the beat frequency $f_B$ and provides unambiguous phase shifts for the virtual modulation frequency for features in the scene located up to a maximum distance from the camera equal to $c/2f_B$.

Whereas CW-TOF camera 20 is described above as illuminating a scene it images with two light waves each of which is amplitude modulated at a different frequency, a CW-TOF camera in accordance with an embodiment of the disclosure is not limited to illuminating a scene with light that is amplitude modulated at only two frequencies. A CW-TOF camera in accordance with an embodiment of the disclosure may illuminate a scene with a plurality of more than two light waves, each of which has its intensity modulated at a different modulation frequency. And the CW-TOF camera may acquire and unwrap wrapped phase shifts for each of the modulation frequencies to determine distances to features in the scene. Optionally, a distance to a given feature in the scene may be a weighted average of distances to the feature provided responsive to unwrapped phase shifts for all or some of the modulation frequencies. In an embodiment of the disclosure if the plurality of modulation frequencies comprises N different modulation frequencies, $f_n$, $1 \le n \le N$, the frequencies satisfy a relationship $f_{n+1}=[(n+1)/n]f_n$.

Optionally, the CW-TOF camera unwraps wrapped phase shifts for each modulation frequency of the plurality of modulation frequencies responsive to DINs provided for wrapped phase shifts of pairs of the modulation frequencies. The CW-TOF may unwrap wrapped phase shifts for a given modulation frequency of the light waves responsive to a DIN defined for the given modulation frequency and a virtual modulation frequency determined for a pair of the modulation frequencies of the light waves.

In an embodiment, the CW-TOF camera may unwrap wrapped phase shifts for each of first and second pairs of the frequencies to provide first and second virtual modulation frequencies for the camera equal to beat frequencies $f_{B1}$ and $f_{B2}$ respectively of the first and second pairs of frequencies. The first and second virtual modulation frequencies $f_{B1}$ and $f_{B2}$ provide unambiguous phase shifts and corresponding unambiguous distances for features in the scene if the features are located at distances from the CW-TOF camera that are less than maximum unambiguous ranges $c/2f_{B1}$ and $c/2f_{B1}$ respectively. If the scene comprises features at distances greater than the maximum unambiguous ranges, unwrapped phase shifts provided by the CW-TOF camera are generally ambiguous, and may be considered to be wrapped virtual phase shifts.

In an embodiment, the CW-TOF camera determines a DIN for virtual wrapped phase shifts for the first and second virtual modulation frequencies to unwrap and disambiguate the wrapped virtual phase shifts. The CW-TOF camera appears to operate at a third virtual modulation frequency $f_{B3}$ equal to a beat frequency of $f_{B1}$ and $f_{B2}$. The virtual modulation frequency $f_{B3}$ extends a maximum unambiguous range of the CW-TOF camera to $c/2f_{B3}=c/2/(|f_{B1}-f_{B2}|)$. Using a virtual modulation frequency of a CW-TOF camera to determine another virtual modulation frequency for the CW-TOF camera may be referred to as "cascading" the virtual operating frequency.

Cascading virtual modulation frequencies may be performed by processor 25 using any of various suitable processing architectures. For example, processor 25 may have an architecture configured to use a same digital signal processing (DSP) block to process wrapped phase shifts determined for first and second pairs of modulation frequencies, comprising any combination of real and/or virtual modulation frequencies, and provide wrapped virtual phase shifts for each of first and second virtual modulation frequencies. The first and second virtual modulation frequencies are beat frequencies of the first and second pairs of modulation frequencies respectively. The same DSP block may then be used by processor 25 to process the wrapped virtual phase shifts of the first and second virtual modulation frequencies to provide virtual phase shifts for a third virtual modulation frequency, which is a beat frequency of the first and second virtual modulation frequencies. Alternatively, processor 25 may comprise a tree configuration of DSP blocks for cascading virtual modulation frequencies. Each of first and second DSP blocks in the tree configuration processes phase shifts for a different pair of modulation frequencies comprising any combination of real and virtual modulation frequencies, to provide virtual phase shifts for first and second virtual modulation frequencies respectively. The first and second DSP blocks transmit the phase shifts for the first and second virtual modulation frequencies that they respectively produce to a third, shared DSP block in the DSP tree. The third DSP block processes the phase shifts it receives from the first and second DSP blocks to generate virtual phase shifts for a third virtual modulation frequency.

In FIG. 1A and the discussion of CW-TOF 20, CW-TOF camera 20 appears to be illuminating scene 30 with two separate beams 40 and 50 modulated respectively at frequencies $f_1$ and $f_2$, and might be considered to illuminate the scene sequentially, first with one and then with the other of the beams. Whereas a CW-TOF camera in accordance with an embodiment of the disclosure may illuminate a scene sequentially with light waves modulated at different frequencies to acquire and unwrap phase shifts for each of a plurality of different modulation frequencies to determine distance to features in the scene, practice of an embodiment of the disclosure is not limited to "sequential illumination". A CW-TOF camera in accordance with an embodiment of the disclosure may for example, illuminate a scene simultaneously with light modulated at each of a plurality of different modulation frequencies and/or with light simultaneously modulated at a plurality of different modulation frequencies to acquire wrapped phase shifts for each of the modulation frequencies and determine distances to features in the scene. To acquire wrapped phase shifts for each of the modulation frequencies, the camera may, by way of example, control pixels in at least one photosensor comprised in the camera to simultaneously sample and register reflected light from the scene at sampling frequencies equal to each of the modulation frequencies and/or harmonics of the modulation frequencies.

For example, assuming the CW-TOF camera is similar to CW-TOF camera 20 and illuminates a scene simultaneously with light amplitude modulated at frequencies $f_1$ and $f_2$ controller 24 may control each pixel in a pair of adjacent pixels 23 in photosensor 22 to sample and register reflected light from the scene at a sampling frequency equal to a different one of modulation frequencies $f_1$ and $f_2$. The pixel sampling reflected light at frequency f1 or f2 accumulates a quantity of photocharge responsive to reflected light that may be processed to provide wrapped phase shifts for modulation frequency $f_1$ or $f_2$ respectively.

FIG. 2 shows a flow diagram of a procedure 300 by which CW-TOF camera 20 determines distances to features in scene 30 using light modulated at modulation frequencies $f_1$ and $f_2$. Optionally, as in the examples described in FIGS. 1A and 1B, $f_1/f_2 = M/(M+1)$ and period of their beat frequency is equal to $M_1$ periods of modulation frequency $f_1$ and $M_2$ periods of modulation frequency $f_2$.

In a block 301 CW-TOF camera 20 illuminates scene 30 with light modulated at a modulation frequency $f_1$ to acquire an image the scene that provides data for determining wrapped phase shifts for features in the scene for modulation frequency $f_1$. In a block 303, CW-TOF camera 20 optionally processes the data to provide wrapped phase shifts $\phi'(k,f_1)$ for features in the scene, where the index k identifies a k-th feature in the scene is imaged by the CW-TOF camera. Optionally, in a block 305, CW-TOF camera 20 illuminates scene 30 with light modulated at a modulation frequency $f_2$ to image the scene and provide data for determining wrapped phase shifts for features in the scene for modulation frequency $f_2$. In a block 307 the CW-TOF camera optionally processes the data to provide wrapped phase shifts $\phi'(k,f_2)$.

In a block 309, CW-TOF camera 20 determines trial indicators $x_{12}(k)$ for features k in scene 30 optionally in accordance with an expression $x_{12}(k)=\phi'(k,f_1)-(f_1/f_2)\phi'(k,f_2)$ and in a block 311 may convert $x_{12}(k)$ to an integer function $IX_{12}(k)=x_{12}(k)/\Delta\phi=\text{nint}[(\phi'(k,f_1)-(f_1/f_2)\phi'(k,f_2))/\Delta\phi]$.

In an embodiment of the disclosure, in a block 313 CW-TOF camera 20 optionally processes trial indicator integer values $IX_{12}(k)$ in accordance with a homogenizing procedure, also referred to as a "homogenizer" (H), to remove outlier values. In an embodiment, index k is an integer belonging to a set of K consecutive integers for which any two consecutive integers differ by one, and for which any two indices k that differ by one identify two features of scene 30 that optics 21 images on adjacent regions of photosensor 22 (FIG. 1A). Optionally, a first integer in the series of integers is equal to 1. In accordance with the homogenizing procedure, CW-TOF camera 20 determines differences $\Delta IX_{12}(k)=IX_{12}(k)-IX_{12}(k-1)$ for $2\le k\le K$. And for each k for which $1\le k\le(K-1)$, determines a corrective bias equal to $CB(k)=\Delta IX_{12}(k+1)|\Delta IX_{12}(k)|$ subject to the constraint that $|CB(k)|\le 1$. The camera determines a "homogenized" trial integer indicator $IX_{12}(k)^*=IX_{12}(k)+CB(k)$. The homogenizing procedure removes positive and negative aberrant spikes in the values for $IX_{12}(k)$ having magnitude 1. An aberrant spike is a value for $IX_{12}(k)$ that differs from $IX_{12}(k-1)$ and $IX_{12}(k+1)$ by a same positive or a same negative difference. Whereas a homogenized trial integer indicator $IX_{12}(k)^*$ or an unhomogenized trial integer indicator $IX_{12}(k)$ may be used, albeit with generally different error rates, to determine wrapping numbers $n_1(k)$ and $n_2(k)$ for wrapped phase shifts as discussed below, hereinafter $IX_{12}(k)^*$ is used, unless indicated otherwise, as a generic reference to both $IX_{12}(k)^*$ and $IX_{12}(k)$ Optionally in a block 315, CW-TOF camera 20 determines wrapping numbers $n_1(k)$ and $n_2(k)$ for wrapped phase shifts $\phi'(k,f_1)$ and $\phi'(k,f_2)$. Any of different methods may be used to determine wrapping numbers $n_1(k)$ and $n_2(k)$. In an embodiment, CW-TOF camera 20 may have a look up table (LUT) optionally stored in processor 25 that associates values for $IX_{12}(k)^*$ with wrapping numbers $n_1(k)$ and $n_2(k)$. For example, for modulation frequencies $f_1$ and $f_2$ as shown in FIG. 1B, for $IX_{12}(k)^*=(M_1-1)$ along round trip time axis 203, a LUT in accordance with an embodiment of the disclosure may provide $m_1(k)=2$ and $m_2(k)=3$ and corresponding wrapping numbers $n_1(k)=(m_1(k)-1)=1$ and $n_2(k)=(m_2(k)-1)=2$.

In an embodiment, in block 315, CW-TOF camera 20 may calculate wrapping numbers $n_1(k)$ and $n_2(k)$ $IX_{12}(k)^*$ from $IX_{12}(k)^*$. For example, for a given $IX_{12}(k)^*$ the CW-TOF camera may determine:

$$N_O(k)=0.5[(\text{sign}(IX_{12}(k)^*)+1]IX_{12}(k)^*;$$

$$n_1(k)=M_1[1-\text{fix}((M_1-N_O(k))/M_1]-IX_{12}(k)^*; \text{ and}$$

$$n_2(k)=M_2[1-\text{fix}((M_2-N_O(k))/M_2]-IX_{12}(k)^*.$$

In the expressions above the sign function takes the sign of its argument and the fix function gives a nearest integer between its argument and zero.

Optionally in a block 317, CW-TOF camera 20 determines unwrapped phase shifts $\phi(k,f_1)$ and $\phi(k,f_2)$ in accordance with $\phi(k,f_1)=\phi'(k,f_1)+2\pi n_1(k)$ and $\phi(k,f_2)=\phi'(k,f_2)+2\pi n_1(k)$. Optionally, the CW-TOF camera determines a test ratio, $TR(k)=\phi(k,f_2)/\phi(k,f_1)$ and uses TR(k) to provide a measure of reliability of the unwrapped phase shifts. If a difference between TR(k) and its expected value $f_2/f_2$ is greater than a predetermined threshold, the unwrapped phase shifts may be considered unreliable measures of their corresponding real phase shifts $\phi^*(k,f_1)$ and $\phi^*(k,f_2)$ and be discarded.

In a block 319 CW-TOF camera 20 may determine a distance to a k-th feature in scene 30 responsive to at least one unwrapped phase shift $\phi(k,f_1)$ and $\phi(k,f_2)$ that the camera determines for the feature. In an embodiment, CW-TOF camera 20 determines a weighted average $\Phi_W(k)$ optionally defined by an expression $\Phi_W(k)=\omega_1\phi(k,f_1)+\omega_2 f_1/f_2\phi(k,f_2)$, where weights $\omega_1$ and $\omega_2$ sum to one, and are determined as functions error in determining unwrapped phase shifts $\phi(k,f_1)$ and $\phi(k,f_2)$.

There is therefore provided in accordance with an embodiment of the disclosure a continuous wave time of flight (CW-TOF) camera operable to determine distances to features in a scene, the CW-TOF camera comprising: a light source configured to transmit light modulated at first and second frequencies $f_1$ and $f_2$ to illuminate the scene; a photosensor configured to register amounts of light reflected by features in the scene from the transmitted light modulated at each of the first and second modulation frequencies; and a processor configured to process amounts of reflected light from a k-th feature in the scene registered by the photosensor to provide wrapped phase shifts for frequencies $f_1$ and $f_2$ and a trial indicator for wrapping numbers of the wrapped phase shifts responsive to the wrapped phase shifts, and unwrap at least one of the wrapped phase shifts responsive to the trial indicator and a piecewise constant or linear discretized indicator (DIN) function of frequencies $f_1$ and $f_2$ and a round trip time $t_R$ for light from and back to the camera for the k-th feature.

Optionally, the DIN function is discontinuous at boundaries of domains of adjacent pieces of the function. Additionally or alternatively the DIN function optionally comprises a linear sum of the form $(\alpha\phi^*(t_R,f_1)-\beta\phi^*(t_R,f_2))$ where $\phi^*(t_R,f_1)$ and $\phi^*(t_R,f_2)$ are theoretical phase shifts for frequencies $f_1$ and $f_2$ respectively as functions of $t_R$. Optionally, the trial indicator for the k-th feature comprises a linear sum of the wrapped phase shifts of the form $(\gamma\phi'(k,f_1)-\eta\phi'(k,f_2))$, where $\phi'(k,f_1)$ and $\phi'(k,f_2)$ are the wrapped phase shifts for frequencies $f_1$ and $f_2$ respectively. Optionally $\alpha=\gamma$ and $\beta=\eta$. Optionally, the absolute value $|\alpha/\beta|=f_2/f_1$.

In an embodiment of the disclosure, each modulation frequency $f_1$ and $f_2$ is equal to an integer multiple of a same frequency. Optionally, a ratio between a lower modulation frequency and a higher modulation frequency of the frequencies $f_1$ and $f_2$ is equal to M/(M+1), where M is an integer.

In an embodiment of the disclosure, the DIN function is an integer function having discrete integer values. Optionally, the discrete integer values are equal to the linear sum quantized by a quantization step equal to $2\pi|(f_2-f_1)|/f_2$. The trial indicator may be equal to an integer. Optionally, the integer is equal to the linear sum of the wrapped phase shifts quantized by a quantization step equal to $2\pi|(f_2-f_1)|/f_2$.

In an embodiment the processor is configured to determine if the trial indicator integer is an outlier, and if so modify the integer. If IX(k) represents the trial indicator integer for the k-th feature and IX(k−1) and IX(k+1) the trial indicator integer values for features adjacent to and on opposite sides of the k-th feature, IX(k) is optionally determined an outlier if [IX(k)−IX(k−1)]=−[IX(k+1)−IX(k)] and |(IX(k)−IX(k−1)|=1. Optionally, if IX(k) is determined to be an outlier, the processor modifies IX(k) by adding to IX(k) a sum equal to [IX(k+1)−IX(k)]·|(IX(k)−IX(k−1)|.

In an embodiment of the disclosure, the light source is configured to selectively transmit light at a plurality of different modulation frequencies greater than two and the processor is configured to: process amounts of reflected light from the k-th feature in the scene registered by the photosensor to determine wrapped phase shifts for each frequency of first and second pairs of different frequencies of the plurality of frequencies; determine a trial indicator for each first and second pair of frequencies responsive to the wrapped phase shifts determined for the pair of frequencies; unwrap at least one wrapped phase shift determined for each pair of frequencies responsive to the determined trial indicator and a DIN function for the pair; determine a first virtual wrapped phase shift for a first virtual modulation frequency equal to a beat frequency of the frequencies in the first pair of frequencies and a second virtual wrapped phase shift for a second virtual modulation frequency equal to a beat frequency of the frequencies in the second pair of frequencies; determine a trial indicator for the first and second virtual wrapped phase shifts; and unwrap at least one of the first and second virtual wrapped phase shifts responsive to the determined trial indicator and a DIN function for the first and second virtual modulation frequencies.

There is further provided in accordance with an embodiment of the disclosure a method of unwrapping a wrapped phase shift for light reflected by a feature in a scene from light transmitted to illuminate the scene, the method comprising: transmitting light modulated at first and second frequencies $f_1$ and $f_2$ to illuminate the scene; registering amounts of light reflected by the feature from the transmitted light modulated at each of the first and second frequencies; processing amounts of reflected light from the feature to provide wrapped phase shifts for frequencies $f_1$ and $f_2$; determining a value for a trial indicator for wrapping numbers of the wrapped phase shifts responsive to the provided wrapped phase shifts; and determining a wrapping number for reflected light for at least one of the modulation frequencies responsive to the value of the trial indicator and a piecewise constant or linear, discretized indicator (DIN) function of frequencies $f_1$ and $f_2$ and a round trip time $t_R$ for light from and back to the camera for the feature.

Optionally, the DIN function comprises a linear sum of the form $(\alpha\phi^*(t_R,f_1)-\beta\phi^*(t_R,f_2))$ where $\phi^*(t_R,f_1)$ and $\phi^*(t_R,f_2)$ are theoretical phase shifts for frequencies $f_1$ and $f_2$ respectively as functions of $t_R$, and $\alpha$ and $\beta$ are positive constants. The trial indicator for the feature may comprise a linear sum of the wrapped phase shifts of the form $(\gamma\phi'(k,f_1)-\eta\phi'(k,f_2))$, where $\phi'(k,f_1)$ and $\phi'(k,f_2)$ are the wrapped phase shifts for frequencies $f_1$ and $f_2$ respectively, and $\gamma$ and $\eta$ are positive constants. Optionally, $\alpha=\gamma$ and $\beta=\eta$ and $|\alpha/\beta|=f_2/f_1$.

There is further provided in accordance with an embodiment of the disclosure a method of determining a distance to a feature in a scene, the method comprising: determining wrapped phase shifts for light that is reflected from the feature and is amplitude modulated at at least two modulation frequencies $f_1$ and $f_2$; determining a wrapping number for reflected light for at least one of the modulation frequencies $f_1$ and $f_2$ responsive to a piecewise constant or linear, discretized indicator (DIN) function of frequencies $f_1$ and $f_2$; and determining a distance to the feature responsive to the wrapping number. And there is optionally provided a TOF camera that uses the method to determine the distance to the feature.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A continuous wave time of flight (CW-TOF) camera operable to determine distances to features in a scene, the CW-TOF camera comprising:
   a light source configured to transmit light modulated at first and second frequencies $f_1$ and $f_2$ to illuminate the scene;
   a photosensor configured to register amounts of light reflected by features in the scene from the transmitted light modulated at each of the first and second modulation frequencies; and
   a processor configured to process amounts of reflected light from a k-th feature in the scene registered by the photosensor to provide wrapped phase shifts for frequencies $f_1$ and $f_2$ and a trial indicator for wrapping numbers of the wrapped phase shifts responsive to the wrapped phase shifts, and unwrap at least one of the wrapped phase shifts responsive to the trial indicator and a piecewise constant or linear discretized indicator (DIN) function of frequencies $f_1$ and $f_2$ and a round trip time $t_R$ for light from and back to the camera for the k-th feature.

2. The CW-TOF camera according to claim 1 wherein the DIN function is discontinuous at boundaries of domains of adjacent pieces of the function.

3. The CW-TOF camera according to claim 2 wherein the DIN function comprises a linear sum of the form ($\alpha\phi^*(t_R,f_1) - \beta\phi^*(t_R,f_2)$) where $\phi^*(t_R,f_1)$ and $\phi^*(t_R,f_2)$ are theoretical phase shifts for frequencies $f_1$ and $f_2$ respectively as functions of $t_R$.

4. The CW-TOF camera according to claim 3 wherein the trial indicator for the k-th feature comprises a linear sum of the wrapped phase shifts of the form ($\gamma\phi'(k,f_1) - \eta\phi'(k,f_2)$), where $\phi'(k,f_1)$ and $\phi'(k,f_2)$ are the wrapped phase shifts for frequencies $f_1$ and $f_2$ respectively.

5. The CW-TOF camera according to claim 4 wherein $\beta=\gamma$ and $\beta=\eta$.

6. The CW-TOF camera according to claim 3 wherein the absolute value $|\alpha/\beta|=f_2/f_1$.

7. The CW-TOF camera according to claim 6 wherein each modulation frequency $f_1$ and $f_2$ is equal to an integer multiple of a same frequency.

8. The CW-TOF camera according to claim 7 wherein a ratio between a lower modulation frequency and a higher modulation frequency of the frequencies $f_1$ and $f_2$ is equal to $M/(M+1)$, where M is an integer.

9. The CW-TOF camera according to claim 5 wherein the DIN function is an integer function having discrete integer values.

10. The CW-TOF camera according to claim 9 wherein the discrete integer values are equal to the linear sum quantized by a quantization step equal to $2\pi|(f_2-f_1)|/f_2$.

11. The CW-TOF camera according to claim 10 wherein the trial indicator is equal to an integer.

12. The CW-TOF camera according to claim 11 wherein the integer is equal to the linear sum of the wrapped phase shifts quantized by a quantization step equal to $2\pi|(f_2-f_1)|/f_2$.

13. The CW-TOF camera according to claim 11 wherein the processor is configured to determine if the trial indicator integer is an outlier, and if so modify the integer.

14. The CW-TOF camera according to claim 13 wherein if IX(k) represents the trial indicator integer for the k-th feature and IX(k−1) and IX(k+1) the trial indicator integer values for features adjacent to and on opposite sides of the k-th feature, IX(k) is an outlier if $[IX(k)-IX(k-1)]=-[IX(k+1)-IX(k)]$ and $|IX(k)-IX(k-1)|=1$.

15. The CW-TOF camera according to claim 13 wherein if IX(k) is determined to be an outlier, the processor modifies IX(k) by adding to IX(k) a sum equal to $[IX(k+1)-IX(k)]\cdot|(IX(k)-IX(k-1)|$.

16. The CW-TOF camera according to claim 1, wherein the light source is configured to selectively transmit light at a plurality of different modulation frequencies greater than two and the processor is configured to:
   process amounts of reflected light from the k-th feature in the scene registered by the photosensor to determine wrapped phase shifts for each frequency of first and second pairs of different frequencies of the plurality of frequencies;
   determine a trial indicator for each first and second pair of frequencies responsive to the wrapped phase shifts determined for the pair of frequencies;
   unwrap at least one wrapped phase shift determined for each pair of frequencies responsive to the determined trial indicator and a DIN function for the pair;
   determine a first virtual wrapped phase shift for a first virtual modulation frequency equal to a beat frequency of the frequencies in the first pair of frequencies and a second virtual wrapped phase shift for a second virtual modulation frequency equal to a beat frequency of the frequencies in the second pair of frequencies;
   determine a trial indicator for the first and second virtual wrapped phase shifts; and
   unwrap at least one of the first and second virtual wrapped phase shifts responsive to the determined trial indicator and a DIN function for the first and second virtual modulation frequencies.

17. A method of determining a distance to a feature in a scene, the method comprising:
   determining wrapped phase shifts for light that is reflected from the feature and is amplitude modulated at at least two modulation frequencies $f_1$ and $f_2$;
   determining a wrapping number for reflected light for at least one of the modulation frequencies $f_1$ and $f_2$ responsive to a piecewise constant or linear, discretized indicator (DIN) function of frequencies $f_1$ and $f_2$; and
   determining a distance to the feature responsive to the wrapping number.

18. The method according to claim 17 wherein the DIN function comprises a linear sum of the form ($\phi\alpha^*(t_R,f_1) - \beta\phi^*(t_R,f_2)$) where $\phi^*(t_R,f_1)$ and $\phi^*(t_R,f_2)$ are theoretical phase shifts for frequencies $f_1$ and $f_2$ respectively as functions of $t_R$, and $\alpha$ and $\beta$ are constants.

19. The method according to claim 18 wherein determining the wrapping number comprises comparing a trial indicator for the feature with the DIN function, wherein the trial indicator is equal to a linear sum of the wrapped phase shifts of the form ($\gamma\phi'(k,f_1) - \eta\phi'(k,f_2)$), where $\phi'(k,f_1)$ and $\phi'(k,f_2)$ are the wrapped phase shifts for frequencies $f_1$ and $f_2$ respectively, and $\gamma$ and $\eta$ are positive constants.

20. The method according to claim 18 wherein $\alpha=\gamma$ and $\beta=\eta$ and $|\alpha/\beta|=f_2/f_1$.

* * * * *